United States Patent Office 2,974,115
Patented Mar. 7, 1961

2,974,115

ACRYLONITRILE POLYMERS PLASTICIZED BY ADDUCTS OF FORMAMIDE WITH ACRYLONITRILE AND METHOD OF MAKING SAME

Samuel Allen Heininger, Warson Woods, and Paul R. Graham, Richmond Heights, Mo., assignors to Monsanto Chemical Company, St. Louis, Mo., a corporation of Delaware No Drawing. Filed Feb. 17, 1958, Ser. No. 715,505

13 Claims. (Cl. 260—32.4)

This invention relates to acrylonitrile polymers and to methods of preparing polymers of acrylonitrile which are plasticized to impart flexibility to the polymers, increase their processability and impart stability against discoloration by light. More specifically, the invention relates to the use of adducts of acylamides with acrylonitrile as plasticizers for acrylonitrile polymers. It is an object of the invention to plasticize such polymers in order to prevent hardening and embrittlement of the polymer upon aging. A still further purpose of the invention is to provide substances which can be added to conventional polymers to plasticize them, increase their processability and prevent light degradation of the polymers.

Polyacrylonitrile has long been recognized as an extremely difficult polymer to plasticize either as a pure polymer or in copolymer forms. The highly polar nature of polyacrylonitrile makes it difficult to solvate the polymeric structure in order to accomplish plasticization.

It has been discovered that by adding certain adducts of acylamides, such as formamide together with acrylonitrile to polymers of acrylonitrile, there is obtained a marked improvement in the plasticization of the said acrylonitrile polymers, both with regard to plasticization and processability, e.g. in extrusion.

The acrylonitrile polymers with which this invention may be practiced include polyacrylonitrile as a homopolymer, and copolymers of from 20 or more percent and up to 100 percent of acrylonitrile and up to 80 percent of one or more of a wide variety of other unsaturated substances known to be copolymerizable with the acrylonitrile. Thus, the invention is practicable with the well-known fiber-forming copolymers of acrylonitrile, which may be the copolymers of 75 percent or more of acrylonitrile and up to 25 percent of other monomers. Other copolymers of from 20 percent to 100 percent acrylonitrile and 80 to 20 percent of the various other monomers, which copolymers have primary utility in the field of film and molding composition production are also useful.

The plasticized polyacrylonitrile of the present invention is especially useful in the formation of shaped articles in the form of moldings, castings and extrusions, which could not be fabricated from conventional polyacrylonitrile. The products of the present invention are also characterized by unusual solvent resistance, for example, when utilized in the manufacture of gasketing material and as a surface coating.

The other monomers with which the acrylonitrile may be copolymerized to produce resinous substances capable of use in the practice of this invention include vinyl acetate and other vinyl esters of monocarboxylic acids having up to four carbon atoms in the carboxylic acid radical, dimethyl maleate and other alkyl esters of maleic acids, wherein the alkyl radical has up to four carbon atoms, methyl methacrylate or acrylate and other alkyl acrylates and alkyl methacrylates wherein the alkyl radical has up to four carbon atoms, vinyl chloride and other vinyl halides, styrene, alpha-methylstyrene and other vinyl and isopropenyl-substituted aromatic hydrocarbons, methacrylonitrile, vinylidene chloride, vinylpyridine, the vinyl derivatives of other alkyl-substituted pyridines, and the vinyl derivatives of other compounds containing a tertiary amino atom in a heterocyclic ring, vinyl chloroacetate and other vinyl esters of haloacetic acids, methallyl chloroacetate, allyl chloroacetate and chloroallyl chloroacetate, and the corresponding esters of other haloacetic acids, vinylimidazole and other N-vinyl derivatives of heterocyclic nitrogen compounds, and one or more of these and other unsaturated compounds known to be copolymerizable with acrylonitrile.

The acylamide adducts with acrylonitrile as employed in the present invention are based upon acylamides having the formula:

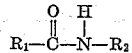

where $R_1$ is a radical selected from the group consisting of hydrogen radicals and alkyl radicals of from 1 to 4 carbon atoms and $R_2$ is a radical selected from the group consisting of hydrogen radicals and alkyl radicals of from 1 to 4 carbon atoms. Examples are formamide, acetamide, propionamide, the butyramides and the valeramides. The N-substituted amides such as N-methyl formamide and N-ethyl acetamide are also included.

The adducts of acylamides with acrylonitrile which are employed in the present acrylonitrile polymer compositions are obtained by the addition of controlled proportions of acrylonitrile to an acylamide, such as formamide. Such addition reactions to obtain adducts are conventional, being carried out, for example, in the presence of catalytic quantities of metallic sodium. It has been found that the adducts which are of utility as plasticizers for polyacrylonitrile contain from 1 to 6 moles of acrylonitrile per mole of formamide, a preferred range being from 2 to 3 moles of acrylonitrile.

The proportion of the formamide adduct which is employed in the plasticization and stabilization of acrylonitrile polymers is from 5 percent to 80 percent by weight relative to the weight of the acrylonitrile polymer to be stabilized. Preferred practice of this invention involves the use of 14 percent to 60 percent by weight of the stabilizer.

The incorporation of the formamide adducts into the acrylonitrile polymer may be carried out by a wide variety of procedures. Thus, the polymer may be treated in granular solid form and mixed physically with the solid adduct, or an aqueous or other liquid solution or dispersion thereof. The physical mixture may take place at room temperature or at higher temperatures, for example, the temperature at which the polymer is semi-solid or fluid. A preferred practice involves the use of solvents or plasticizers for the acrylonitrile polymers in the presence of which the intimate dispersing of the stabilizing additive and the acrylonitrile polymer is more readily effected. The nature of the solvent which is useful in dissolving or softening the acrylonitrile polymer will, to a large extent, depend upon the chemical composition of the acrylonitrile polymers.

The copolymers of 75 percent or more of acrylonitrile and up to 25 percent of the comonomer are well-known fiber-forming compositions and are generally resistant to the effect of many chemical solvents. In the preparation of solutions of such copolymers, solvents, such as N,N-dimethylformamide, N,N-dimethylacetamide, gamma-butyrolacetone, ethylene carbonate, maleic acid, alpha-cyanoacetamide, and tris(dimethylamido) phosphate may be used.

In the treatment of the more soluble types of acrylonitrile polymers, for example those of from 20 percent to 75 percent acrylonitrile and from 25 percent to 80 percent of other monomers copolymerizable therewith, the selection of a solvent is less critical. This type of copolymer may be dissolved or otherwise physically affected by the various ketones, esters and aromatic hydrocarbon types of solvents. In general, the copolymer is placed in a suitable solution, or softened and swelled by the selected medium so as to enable a more ready dispersion of the stabilizer within the solid polymer. Obviously, a solvent which is also capable of dissolving at least to some extent the desired adduct to be used will be exceptionally beneficial. However, the selection of the dispersing agent, the stabilizing agent and the particular method of dispersing the formamide-acrylonitrile in the solid polymer is a matter readily determined by one skilled in the art.

The following examples illustrate specific embodiments of the present invention:

EXAMPLE 1

The preparation of an adduct of formamide with acrylonitrile was carried out by the following process. A 1-liter flask was charged with 90 g. of redistilled formamide, to which there was then added about 2 g. of sodium while maintaining a nitrogen atmophere in the reaction vessel. The reaction charge was then heated while acrylonitrile was gradually added. At a temperature of about 70° C. it was noted that an exothermic reaction began which carried the reaction temperature to about 120° C. The heating was continued for about one hour under refluxing, during which time a total charge of 636 g. of acrylonitrile was added, together with the intermittent addition of further sodium as the catalyst in order to maintain an exothermic reaction in the temperature range of from 100° C. to 120° C. during the preliminary refluxing stage of the reaction. The reaction mixture was then heated to 135–140° C. for ½ hour. The reaction mixture was then cooled and filtered to remove insoluble material. The viscous filtrate was a clear liquid having the formula, $C_{19}H_{21}N_7O$, corresponding to 6 moles of acrylonitrile per mole of formamide.

EXAMPLE 2

The method of Example 1 was repeated with the addition of various proportions of acrylonitrile in order to obtain the desired adducts. It was found that clear liquid products were obtained corresponding to the adducts with 2 moles of acrylonitrile (the product having the formula $C_7H_9N_3O$), with 3 moles of acrylonitrile (the product having the formula $C_{10}H_{12}N_4O$); and 4 moles of acrylonitrile (having the empirical formula of $C_{13}H_{15}N_5O$).

EXAMPLE 3

Polyacrylonitrile as a solid granular polymer was admixed with the stabilizers provided as separate mixtures in proportions corresponding to 50 percent by weight of the adducts relative to 100 parts by weight of polyacrylonitrile. A blank test without a stabilizer was also prepared. In order to secure an intimate admixture the plasticizer, together with the polyacrylonitrile, was dissolved in dimethyl formamide by heating the mixture slowly until solution was effected. This viscous mixture was then cast on a glass plate and placed in an oven at 80° C. to volatilize the solvent. The resulting film of the plasticized polyacrylonitrile was used in the compatibility tests.

The formulated samples were also subjected to 400 hours of exposure to ultraviolet light in the Fadeometer in order to measure light stability. It was found that the control sample was severely blackened as a result of such exposure, while the samples containing the adducts of formamide with acrylonitrile displaced substantially no change of color, with the best results being obtained in the employment of the adducts containing two moles of acrylonitrile and 3 moles of acrylonitrile, respectively, with one mole of formamide.

Heat stability is one of the most important properties of polyacrylonitrile compositions. While many plasticizers will produce flexible compositions at room temperature, the flexibility of these compositions at higher temperatures may vary considerably, i.e., plasticized polyacrylonitrile compositions that are flexible at room temperature often undergo degradation and become useless at elevated temperatures. This property is particularly important in the use of polyacrylonitrile for extrusion, injection molding and other high temperature fabrication methods. The method employed for testing the heat stability of polyacrylonitrile consisted of exposure of plasticized samples at a temperature of 170° C. The plasticized samples were removed from the high temperature oven from time to time and tested for embrittlement. The embrittlement time is designated as that time when the specimen cracked when it is folded back on itself and creased.

In this test, as summarized in the table below, the results are set forth as the number of minutes at 170° C. before severe embrittlement occurs.

| | Formulations (parts by weight) | | |
|---|---|---|---|
| | 1 | 2 | 3 |
| Polyacrylonitrile control | 100 | 100 | 100 |
| Plasticizers: | | | |
| Formamide+2 moles AN | | 50 | |
| Formamide+3 moles AN | | | 50 |
| Min. of heating at 170° C. before embrittlement occurs | 20 | 140 | 100 |

The above data indicate that the adducts of formamide with acrylonitrile are effective plasticizers and heat stabilizers for polyacrylonitrile.

EXAMPLE 4

The compatibility of the present plasticizers with polyacrylonitrile was tested on the plasticized sheet samples of Example 1. The samples thus prepared were then stored at a constant temperature of 23° C. After a storage period of one week, the samples were examined in order to detect any incompatibility. Visual inspection of the plasticized composition was employed, incompatibility of the plasticizer of the polymer being demonstrated by cloudiness, exudation or blushing of the plasticizer.

The table below sets forth the formulations which were employed and the results of the compatibility test; in the table "C" indicates compatibility, while "B" indicates bleeding or incompatibility. The proportion of acrylonitrile in the adduct with formamide varied from 2 to 6 moles of acrylonitrile per mole of formamide. A control test was also included with a conventional plasticizer, dioctyl phthalate.

*Table*
COMPATIBILITY TEST WITH POLYACRYLONITRILE

| Plasticizer | Plasticizer Content, phr. | | | | |
|---|---|---|---|---|---|
| | 10 | 25 | 50 | 100 | 125 |
| Adduct with 2 moles | C | C | C | C | C |
| Adduct with 3 moles | C | C | C | C | C |
| Adduct with 4 moles | C | C | C | C | C |
| Adduct with 6 moles | | | C | | |
| Dioctyl phthalate | | | B | | |

The above data indicate that unusually good compatibility is obtained in the use of polyacrylonitrile plasticizer composed of adducts of formamide with acrylonitrile.

What is claimed is:

1. An acrylonitrile polymer selected from the class consisting of homopolymers of acrylonitrile and copolymers of acrylonitrile and a monoethylenically unsaturated monomer copolymerizable therewith, said copolymer containing at least 20% by weight of combined acrylonitrile, and said polymer containing intimately dispersed therein from 5 percent to 80 percent by weight of an adduct obtained by reacting at an elevated temperature, one mole of an acylamide having the formula:

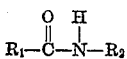

where $R_1$ is a radical selected from the group consisting of hydrogen radicals and alkyl radicals of from 1 to 4 carbon atoms and $R_2$ is a radical selected from the group consisting of hydrogen radicals and alkyl radicals of from 1 to 4 carbon atoms, together with from 1 to 6 moles of acrylonitrile.

2. An acrylonitrile polymer selected from the class consisting of homopolymers of acrylonitrile and copolymers of acrylonitrile and a monoethylenically unsaturated monomer copolymerizable therewith, said copolymer containing at least 20% by weight of combined acrylonitrile, and said polymer containing intimately dispersed therein from 14 percent to 60 percent by weight of an adduct obtained by reacting at an elevated temperature one mole of an acylamide having the formula:

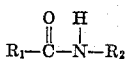

where $R_1$ is a radical selected from the group consisting of hydrogen radicals and alkyl radicals of from 1 to 4 carbon atoms and $R_2$ is a radical selected from the group consisting of hydrogen radicals and alkyl radicals of from 1 to 4 carbon atoms, together with from 1 to 6 moles of acrylonitrile.

3. An acrylonitrile polymer selected from the class consisting of homopolymers of acrylonitrile and copolymers of acrylonitrile and a monoethylenically unsaturated monomer copolymerizable therewith, said copolymer containing at least 20% by weight of combined acrylonitrile, and said polymer containing intimately dispersed therein from 5 percent to 80 percent by weight of an adduct obtained by reacting at an elevated temperature one mole formamide with 1 to 6 moles of acrylonitrile.

4. An acrylonitrile polymer selected from the class consisting of homopolymers of acrylonitrile and copolymers of acrylonitrile and a monoethylenically unsaturated monomer copolymerizable therewith, said copolymer containing at least 20% by weight of combined acrylonitrile, and said polymer containing intimately dispersed therein from 14 percent to 60 percent by weight of an adduct obtained by reacting at an elevated temperature one mole formamide with 1 to 6 moles of acrylonitrile.

5. An acrylonitrile polymer selected from the class consisting of homopolymers of acrylonitrile and copolymers of acrylonitrile and a monoethylenically unsaturated monomer copolymerizable therewith, said copolymer containing at least 20% by weight of combined acrylonitrile, and said polymer containing intimately dispersed therein from 5 percent to 80 percent by weight of an adduct obtained by reacting at an elevated temperature one mole formamide with 2 to 3 moles of acrylonitrile.

6. An acrylonitrile polymer selected from the class consisting of homopolymers of acrylonitrile and copolymers of acrylonitrile and a monoethylenically unsaturated monomer copolymerizable therewith, said copolymer containing at least 20% by weight of combined acrylonitrile, and said polymer containing intimately dispersed therein from 14 percent to 60 percent by weight of an adduct obtained by reacting at an elevated temperature one mole formamide with 2 to 3 moles of acrylonitrile.

7. An acrylonitrile polymer selected from the class consisting of homopolymers of acrylonitrile and copolymers of acrylonitrile and a monoethylenically unsaturated monomer copolymerizable therewith, said copolymer containing at least 20% by weight of combined acrylonitrile, and said polymer containing intimately dispersed therein from 5 percent to 80 percent by weight of an adduct obtained by reacting at an elevated temperature one mole formamide with 2 moles of acrylonitrile.

8. An acrylonitrile polymer selected from the class consisting of homopolymers of acrylonitrile and copolymers of acrylonitrile and a monoethylenically unsaturated monomer copolymerizable therewith, said copolymer containing at least 20% by weight of combined acrylonitrile, and said polymer containing intimately dispersed therein from 14 percent to 60 percent by weight of an adduct obtained by reacting at an elevated temperature one mole formamide with 2 moles of acrylonitrile.

9. An acrylonitrile polymer selected from the class consisting of homopolymers of acrylonitrile and copolymers of acrylonitrile and a monoethylenically unsaturated monomer copolymerizable therewith, said copolymer containing at least 20% by weight of combined acrylonitrile, and said polymer containing intimately dispersed therein from 5 percent to 80 percent by weight of an adduct obtained by reacting at an elevated temperature one mole formamide with 3 moles of acrylonitrile.

10. An acrylonitrile polymer selected from the class consisting of homopolymers of acrylonitrile and copolymers of acrylonitrile and a monoethylenically unsaturated monomer copolymerizable therewith, said copolymer containing at least 20% by weight of combined acrylonitrile, and said polymer containing intimately dispersed therein from 14 percent to 60 percent by weight of an adduct obtained by reacting at an elevated temperature one mole formamide with 3 moles of acrylonitrile.

11. A method of improving the plasticity of polymers of acrylonitrile selected from the class consisting of homopolymers of acrylonitrile and copolymers of acrylonitrile and a monoethylenically unsaturated monomer copolymerizable therewith, said copolymers containing at least 20% by weight of combined acrylonitrile which comprises intimately admixing the said polymers with a solution of an adduct dissolved in a solvent, the said adduct being obtained by reacting at an elevated temperature, formamide with acrylonitrile, the said adduct containing from 1 to 6 moles of acrylonitrile per mole of formamide.

12. A method of improving the plasticity of polymers of acrylonitrile selected from the class consisting of homopolymers of acrylonitrile and copolymers of acrylonitrile and a monoethylenically unsaturated monomer copolymerizable therewith, said copolymers containing at least 20% by weight of combined acrylonitrile which comprises intimately admixing the said polymers with a solution of 5 weight percent to 80 weight percent of an adduct dissolved in a solvent, the said adduct being obtained by reacting at an elevated temperature, formamide with acrylonitrile, the said adduct containing from 1 to 6 moles of acrylonitrile per mole of formamide.

13. A method of improving the plasticity of polymers of acrylonitrile selected from the class consisting of homopolymers of acrylonitrile and copolymers of acrylonitrile and a monoethylenically unsaturated monomer copolymerizable therewith, said copolymers containing at least 20% by weight of combined acrylonitrile which comprises intimately admixing the said polymers with a solution of 14 weight percent to 60 weight percent of an adduct dissolved in a solvent, the said adduct being obtained by reacting at an elevated temperature, formamide with acrylonitrile, the said adduct containing from 2 to 3 moles of acrylonitrile per mole of formamide.

References Cited in the file of this patent

UNITED STATES PATENTS

| | | |
|---|---|---|
| 2,528,710 | Richards | Nov. 7, 1950 |
| 2,531,407 | D'Alelio | Nov. 28, 1950 |